(12) United States Patent
Ehara et al.

(10) Patent No.: US 11,639,015 B2
(45) Date of Patent: May 2, 2023

(54) METHOD FOR PRODUCING SECONDARY BATTERY

(71) Applicant: Prime Planet Energy & Solutions, Inc., Tokyo (JP)

(72) Inventors: Tsuyoshi Ehara, Toyota (JP); Hideki Asadachi, Toyota (JP)

(73) Assignee: PRIME PLANET ENERGY & SOLUTIONS, INC., Tokyo (JP)

(*) Notice: Subject to any disclaimer, the term of this patent is extended or adjusted under 35 U.S.C. 154(b) by 0 days.

(21) Appl. No.: 17/466,519

(22) Filed: Sep. 3, 2021

(65) Prior Publication Data

US 2022/0072747 A1    Mar. 10, 2022

(30) Foreign Application Priority Data

Sep. 10, 2020  (JP) .............................. JP2020-151695

(51) Int. Cl.
*B29C 45/14* (2006.01)
*H01M 10/04* (2006.01)
*B29L 31/34* (2006.01)

(52) U.S. Cl.
CPC ....... *B29C 45/14065* (2013.01); *H01M 10/04* (2013.01); *B29L 2031/3468* (2013.01)

(58) Field of Classification Search
CPC .............................................. B29C 45/14065
See application file for complete search history.

(56) References Cited

U.S. PATENT DOCUMENTS

| 4,732,726 A | * | 3/1988 | Grannen, III ..... B29C 45/14008 425/588 |
| 7,659,013 B2 | * | 2/2010 | Yoon ................... H01M 50/213 429/7 |
| 9,520,590 B2 | * | 12/2016 | Heid ................. B29C 45/14344 |
| 2006/0172038 A1 | | 8/2006 | Funo et al. |

FOREIGN PATENT DOCUMENTS

| EP | 0496331 A2 | 1/1992 |
| JP | 4-239614 A | 8/1992 |
| JP | 7-155918 A | 6/1995 |
| JP | 2006-289688 A | 10/2006 |
| JP | 201244733 | * 10/2010 |
| JP | 2010-260175 A | 11/2010 |

* cited by examiner

*Primary Examiner* — Edmund H Lee
(74) *Attorney, Agent, or Firm* — Hauptman Ham, LLP

(57) ABSTRACT

A method for producing a secondary battery includes a space formation step and an injection molding step. In the space formation step, an outer periphery of a resin blocking portion with a quadrangular prism shape, in a terminal, is plugged to form a resin injection space around the terminal. In the injection molding step, a resin is injected into the injection space. The space formation step includes a constant-dimension pressing step and a constant-pressure pressing step. In the constant-dimension pressing step, a section between a pair of first outer peripheral surfaces of the resin blocking portion, extending parallelly to each other is pressed, whereby a distance between the first outer peripheral surfaces is brought to a predetermined distance. In the constant-pressure pressing step, a section between a pair of second outer peripheral surfaces of the resin blocking portion, extending in a direction intersecting the first outer peripheral surfaces, is pressed.

4 Claims, 4 Drawing Sheets

METHOD FOR PRODUCING SECONDARY BATTERY

BACKGROUND OF THE INVENTION

1. Field of the Invention

The present disclosure relates to a method for producing a secondary battery. The present application claims priority to Japanese Patent Application No. 2020-151695 filed on Sep. 10, 2020, the entire contents whereof are incorporated in the present specification by reference.

2. Description of the Related Art

Secondary batteries are widely used as portable power sources for personal computers and mobile terminals, or as vehicle drive power sources in, for instance, EVs (electric vehicles), HVs (hybrid vehicles) and PHVs (plug-in hybrid vehicles). In a secondary battery, terminals for electrically connecting, to the exterior, a power generation element accommodated in a battery case are used. For example, a resin part may be provided at a predetermined site of the terminal, for the purpose of ensuring insulation between the terminal and the battery case.

One conceivable method for installing a resin part at a predetermined site of the terminal is injection molding. Injection molding is a method for obtaining a molded article by injecting a heat-melted resin material into a mold, followed by cooling and solidification of the resin material. In a case where injection molding is employed, when leakage of the resin material from an injection space to the exterior occurs, it may causes, for instance, a drop in battery performance. For example, in the method for producing an optical module described in Japanese Patent Application Publication No. H04-239614 a resin blocking plate is provided between a cavity portion and an alignment portion, in order to prevent resin overflow from the cavity portion.

SUMMARY OF THE INVENTION

In a case where a quadrangular prism-shaped portion of the terminal is used as a resin blocking portion for resin blocking, the resin blocking portion has to fit into a rectangular hole formed in the mold, without leaving any gap. It is however often difficult to form the shape of the resin blocking portion with high precision, and the dimensions of a plurality of formed resin blocking portions are prone to be dissimilar from each other.

It is deemed that dimensional variability in the resin blocking portion is tolerable if resin blocking at the resin blocking portion can be performed by separately pressing the resin blocking portion in a first direction and in a second direction that intersects the first direction. When attempting however to fill up a gap by pressing of the resin blocking portion at constant pressure both in the first direction and the second direction, a gap is created, under the influence of dimensional variability, between a member pressing in the first direction and a member pressing in the second direction, and thus resin blocking may fail to be performed properly. When the resin blocking portion is simply pressed at a fixed dimension in both the first direction and the second direction, dimensional variability in the resin blocking portion may fail to be absorbed, and the resin blocking portion may suffer, for instance, excessive deformation or damage.

A typical object of the present disclosure is to provide a method for producing a secondary battery in which a resin material can be properly formed at a predetermined site of a terminal.

The method for producing a secondary battery in one aspect disclosed herein includes: a space formation step of forming a resin injection space around a predetermined site of a terminal by plugging an outer periphery of a resin blocking portion, which has a quadrangular prism shape, of the terminal; and an injection molding step of injection-molding a resin part on the terminal by injecting a resin into the injection space, wherein the space formation step includes a constant-dimension pressing step of pressing between a pair of first outer peripheral surfaces extending parallelly to each other, from among four outer peripheral surfaces of the resin blocking portion, thereby bringing a distance between the pair of first outer peripheral surfaces to a predetermined distance; and a constant-pressure pressing step of pressing, at a predetermined pressure, between a pair of second outer peripheral surfaces extending in a direction that intersects the pair of first outer peripheral surfaces, from among the four outer peripheral surfaces of the resin blocking portion.

In the space formation step of the method for producing a secondary battery according to the present disclosure, the pair of first outer peripheral surfaces among the outer peripheral surfaces of the resin blocking portion having a quadrangular prism shape is pressed at a fixed dimension, while the pair of second outer peripheral surfaces is pressed at constant pressure. Therefore, a gap is not readily created between the two pressing members, unlike in the case of pressing at constant pressure in both directions. Also, for instance excessive deformation and damage to the terminal are less likely to occur, as compared with the case of simple constant-dimension pressing in both directions. Accordingly, a resin material can be properly formed at a predetermined site of the terminal.

In an effective aspect of the method for producing a secondary battery disclosed herein, in the resin blocking portion of the terminal, the distance between the pair of first outer peripheral surfaces is smaller than the distance between the pair of second outer peripheral surfaces. In a case where a terminal is formed in which the distance between the pair of first outer peripheral surfaces is smaller than the distance between the pair of second outer peripheral surfaces, dimensional variability between the first outer peripheral surfaces is prone to be structurally smaller than dimensional variability between the second outer peripheral surfaces. Therefore, injection molding is carried out properly in a state where for instance excessive deformation of the terminal is suppressed, by pressing at a fixed dimension between the first outer peripheral surfaces of smaller dimensional variability.

The terminal may be formed as a result of a step of cutting a plate material in the thickness direction. The pair of first outer peripheral surfaces of the resin blocking portion of the terminal may be part of a pair of plate surfaces of a plate material prior to being cut. It is herein easier to reduce variability in the thickness of the plate material than to reduce variability in cut dimensions. Therefore, variability in the distance between the pair of first outer peripheral surfaces can be suppressed properly by using the plate surfaces of the plate material as the first outer peripheral surfaces of the resin blocking portion.

In an effective aspect of the method for producing a secondary battery disclosed herein, when T is a thickness in a direction, which is perpendicular to the first outer peripheral surfaces, of a portion of contact with the second outer peripheral surfaces, of a constant-pressure pressing member that is pressed against the second outer peripheral surfaces for executing the constant-pressure pressing step, and DA is a distance between the pair of first outer peripheral surfaces in a state where the constant-dimension pressing step has been performed, $0 \leq (DA-T) \leq 50$ μm is satisfied. In this case, the dimension of a gap, if any, which may be created between the two pressing members, is 50 μm or less. Outflow of resin through the gap is unlikely if the dimension of the gap is 50 μm or less. Therefore, a resin material is properly formed on the terminal.

DESCRIPTION OF THE PREFERRED EMBODIMENTS

Figure 1:
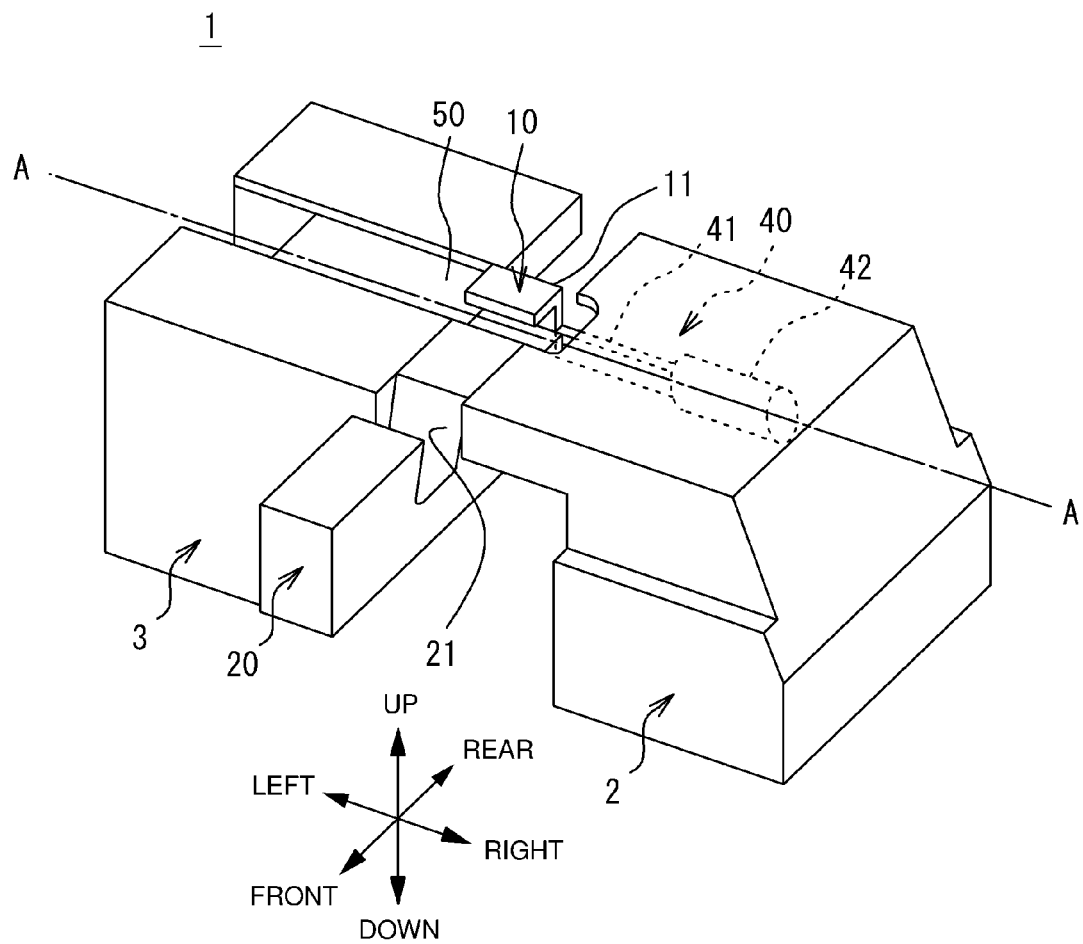
FIG. 1 is a perspective-view diagram of an injection molding machine 1 as obliquely viewed overhead from the right.

One typical embodiment of the present disclosure will be explained below with reference to accompanying drawings. Any features other than the matter specifically set forth in the present specification and that may be necessary for carrying out the present disclosure can be regarded as instances of design matter for a person skilled in the art based on known techniques in the technical field in question. The disclosure can be realized on the basis of the disclosure of the present specification and common technical knowledge in the relevant technical field. In the drawings below, members and portions that elicit identical effects are denoted with identical reference symbols. The dimensional relationships (length, width, thickness and so forth) in the drawings do not reflect actual dimensional relationships.

Figure 2:
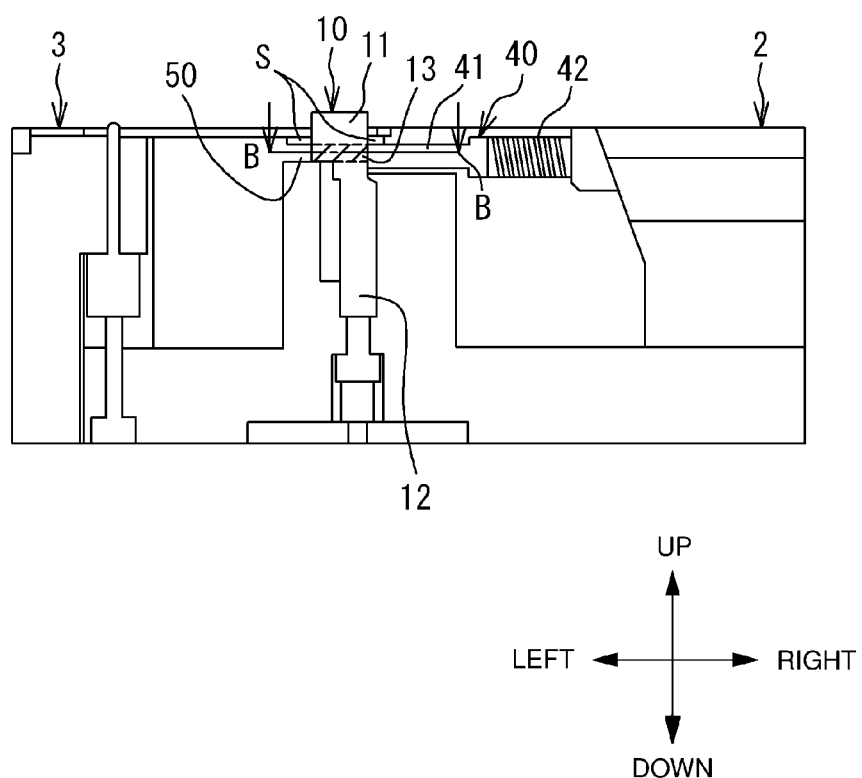
FIG. 2 is a cross-sectional diagram of a view along the line arrow A-A in FIG. 1.
Figure 3:
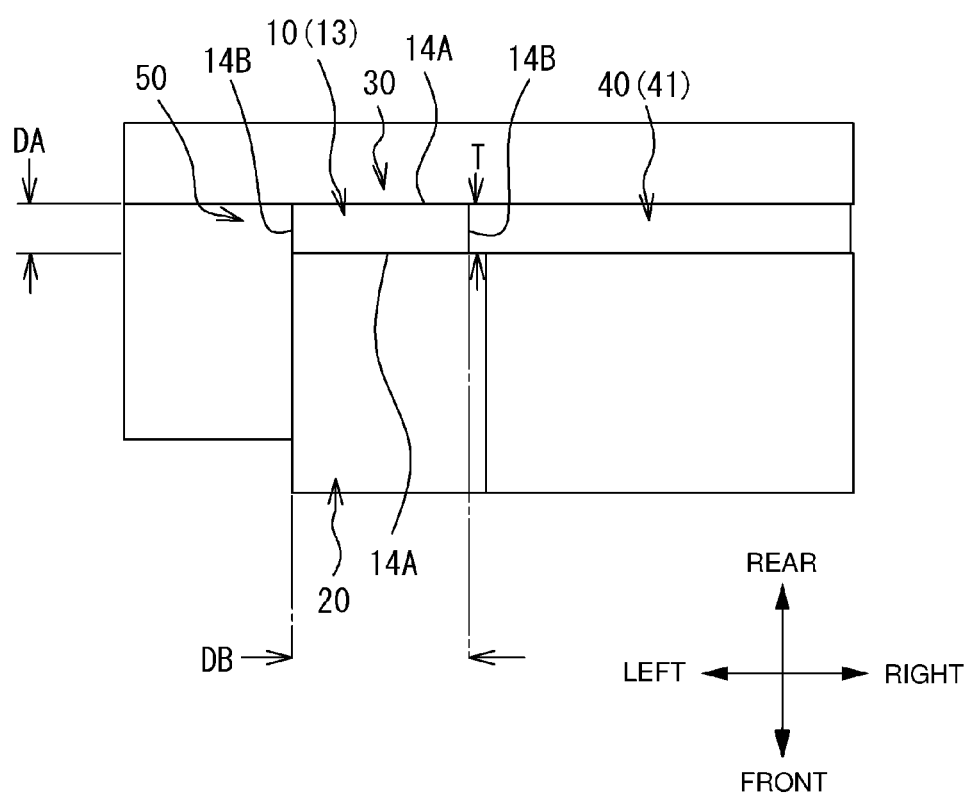
FIG. 3 is a cross-sectional diagram of a view along the line arrow B-B in FIG. 2.

FIG. 1 is a perspective-view diagram of an injection molding machine 1 as obliquely viewed overhead from the right. The upper side of the paper surface in FIG. 1 is herein the upper side of an injection molding machine 1 and a terminal 10, while the lower side of the paper surface is the lower side of the injection molding machine 1 and the terminal 10. The foreground right side of the paper surface in FIG. 1 is herein the right side of the injection molding machine 1 and the terminal 10, while the far left side of the paper surface is the left side of the injection molding machine 1 and the terminal 10. The foreground left side of the paper surface in FIG. 1 is herein the front side of the injection molding machine 1 and the terminal 10, while the far right side of the paper surface is the rear side of the injection molding machine 1 and the terminal 10. FIG. 2 is a cross-sectional diagram of a view along the line arrow A-A in FIG. 1. Therefore, the vertical direction on the paper surface in FIG. 2 is herein the vertical direction of the injection molding machine 1 and the terminal 10, while the left-right direction of the paper surface is the left-right direction of the injection molding machine 1 and the terminal 10. FIG. 3 is a cross-sectional diagram of a view along the line arrow B-B in FIG. 2. Therefore, the vertical direction of the paper surface in FIG. 3 is herein the front-rear direction of the injection molding machine 1 and the terminal 10, while the left-right direction of the paper surface is the left-right direction of the injection molding machine 1 and the terminal 10.

Terminal

The terminal 10 of the secondary battery produced in accordance with the production method of the present embodiment will be explained first. The terminal 10 electrically connects, to the exterior, a power generation element accommodated in a battery case of the secondary battery. As illustrated in FIG. 2, the terminal 10 is a substantially plate-shaped member the longitudinal direction whereof runs in the vertical direction. The terminal 10 has an outer exposed portion 11 and an accommodated portion 12. The outer exposed portion 11 is exposed outside the battery case. The accommodated portion 12 is accommodated in the interior of the battery case. The width of the outer exposed portion 11 in the left-right direction is larger than the width of the accommodated portion 12 in the left-right direction. As illustrated in FIG. 1, the upper end of the outer exposed portion 11 is bent toward the front (front side).

As illustrated in FIG. 2, a site having a quadrangular prism shape in the terminal 10, and positioned between the outer exposed portion 11 and the accommodated portion 12, constitutes a resin blocking portion 13 at which resin leakage is blocked at the time of injection molding described below. A resin injection space S becomes formed around a predetermined site of the terminal 10 (above the resin blocking portion 13 in the present embodiment) when the terminal 10 is fitted to the injection molding machine 1 and the outer periphery of the resin blocking portion 13 is plugged. A resin is injected into the injection space S, and is solidified thereafter, so that a resin part becomes injection-molded at the predetermined site. The formed resin part insulates the terminal 10 and the battery case.

As illustrated in FIG. 3, a pair of surfaces facing frontward and rearward and extending parallelly to each other, from among the four outer peripheral surfaces of the resin blocking portion 13 having a quadrangular prism shape, constitutes first outer peripheral surfaces 14A. From among the four outer peripheral surfaces of the resin blocking portion 13, a pair of surfaces extending in a direction that intersects the first outer peripheral surfaces 14A (i.e. pointing leftward and rightward in FIG. 3) constitute second outer peripheral surfaces 14B. In the present embodiment, a distance DA between the pair of first outer peripheral surfaces 14A of the resin blocking portion 13 is smaller than a distance DB between the pair of second outer peripheral surfaces 14B. Details are described further on.

At least a portion of the terminal 10 of the present embodiment including the resin blocking portion 13 is formed as a result of a step of cutting, in the thickness direction, a plate material of uniform thickness. The thickness direction of the plate material matches the front-rear direction of the terminal 10. Accordingly, the pair of first outer peripheral surfaces 14A of the resin blocking portion 13 of the terminal 10 is part of a pair of plate surfaces of a plate material prior to being cut. In other words, the distance DA between the pair of first outer peripheral surfaces 14A matches the thickness of the plate material prior to being cut. It is herein easier to reduce variability in the thickness of the plate material than to reduce variability in the cut dimensions of the plate material. Therefore, variability in the distance DA between the pair of first outer peripheral surfaces 14A is thus suppressed properly.

It should be noted that at least one from among the positive electrode terminal and negative electrode terminal of the secondary may be produced in accordance with the production method according to the present disclosure. The material that forms the terminal 10 is selected as appropriate in accordance with various conditions (for instance whether the terminal is a positive electrode terminal or a negative electrode terminal). For instance, the material of the outer exposed portion 11 and the material of the accommodated portion 12 in the terminal 10 may be different from each other. In this case, the resin part that is injection-molded may double as the outer exposed portion 11 and as a fixing portion that fixes the accommodated portion 12 in the terminal 10. For instance, at least any metal such as aluminum or copper can be used as the material of the terminal 10.

Injection Molding Machine

The injection molding machine 1 used in the production process of the secondary battery of the present embodiment will be explained next. As illustrated in FIG. 1, the injection molding machine 1 of the present embodiment is provided with a right base 2, a left base 3, a constant-dimension pressing member 20, a first fixed member 30 (see FIG. 3), a constant-pressure pressing member 40 and a second fixed member 50. The injection molding machine 1 further has a lid member (not shown) that covers the top of the terminal 10 at the time of injection molding. The right base 2 is disposed to the right of the terminal 10 where a resin material is to be formed by injection-molding. The constant-pressure pressing member 40 is provided in the right base 2. The left base 3 is disposed on the left of the terminal 10. A second fixed member 50 (described in detail further on) is provided in the left base 3.

The constant-dimension pressing member 20 is disposed, between the right base 2 and the left base 3, and on the front of the terminal 10, so as to be movable in the front-rear direction. The first fixed member 30 (see FIG. 3) is disposed on the rear side of the terminal 10. As the constant-dimension pressing member 20 moves forward, the terminal 10 becomes pressed between the constant-dimension pressing member 20 and the first fixed member 30. In further detail, the constant-dimension pressing member 20 presses the resin blocking portion 13 of the terminal 10 between the pair of first outer peripheral surfaces 14A, as a result of which the distance DA between the pair of first outer peripheral surfaces 14A is brought to a predetermined distance, as illustrated in FIG. 3.

An example of a moving mechanism for causing the constant-dimension pressing member 20 to move in the front-rear direction will be explained next. As illustrated in FIG. 1, an inclined portion 21 slanting obliquely with respect to the front-rear direction is formed at the top of the constant-dimension pressing member 20 of the present embodiment. When a lid member (not shown) that covers the top of the terminal 10 is fitted from above, in a state where the terminal 10 is disposed between the constant-dimension pressing member 20 and the first fixed member 30, an actuating piece (not shown) that protrudes downward from the lid member slides over the inclined portion 21 of the constant-dimension pressing member 20. As a result, the actuating piece becomes pushed in downward, and in consequence the constant-dimension pressing member 20 moves rearward up to a predetermined position. Therefore, the moving mechanism of the constant-dimension pressing member 20 of the present embodiment is less susceptible to the influence of heat at the time of melting of the resin, unlike in instances where a cylinder or the like is used. Further, the moving mechanism of the constant-dimension pressing member 20 of the present embodiment allows for high-precision constant-dimension pressing of the terminal 10 between the first outer peripheral surfaces 14A. The moving mechanism of the constant-dimension pressing member 20 may however be modified. For instance, an actuator such as a motor can be used as the moving mechanism.

The constant-pressure pressing member 40 has a contact section 41 and a driving section 42. The leading end face of the contact section 41 (flat surface of the left end, in the present embodiment) comes in contact with the right-side second outer peripheral surface 14B (see FIG. 3) of the resin blocking portion 13 of the terminal 10. The second fixed member 50 comes in contact with the left-side second outer peripheral surface 14B of the resin blocking portion 13.

The contact section 41 of the present embodiment is a rigid plate-shaped member. As illustrated in FIG. 3, the reference symbol T denotes the thickness, in a direction perpendicular to the first outer peripheral surfaces 14A (thickness in the front-rear direction, in the present embodiment), of a contact portion (i.e. tip portion) with the second outer peripheral surfaces 14B of the terminal 10, in the contact section 41 of the constant-pressure pressing member 40. As pointed out above, DA denotes the distance between the pair of first outer peripheral surfaces 14A of the terminal 10. In this case the various members are formed so that there holds $0 \leq (DA-T) \leq 50$ μm. This effect will be described later on.

The driving section 42 is an actuator for causing the contact section 41 to move in the left-right direction. In further detail, the driving section 42 pushes in the contact section 41 towards the left in such a manner so as to press the resin blocking portion 13 of the terminal 10 between the pair of second outer peripheral surfaces 14B at a predetermined pressure (fixed pressure). It should be noted that the driving section 42 of the present embodiment doubles as an ejector mechanism that pushes the terminal 10 out after injection molding is complete.

Production Process

The production process of the secondary battery (more specifically the terminal 10) in the present embodiment will be explained next. The production process of the terminal 10 in the present embodiment includes a space formation step and an injection molding step. In the space formation step, the outer periphery of the resin blocking portion 13 of quadrangular prism shape of the terminal 10 is plugged, and as a result a resin injection space S (see FIG. 2) becomes formed around a predetermined site of the terminal 10. In further detail, the space formation step includes a constant-dimension pressing step and a constant-pressure pressing step.

In the constant-dimension pressing step, the resin blocking portion 13 is pressed between the pair of first outer peripheral surfaces 14A so that the distance DA between the pair of first outer peripheral surfaces 14A becomes a predetermined distance. The gap between the front-side first outer peripheral surface 14A and the constant-dimension pressing member 20, and the gap between the rear-side first outer peripheral surface 14A and the first fixed member 30 become plugged as a result. It should be noted that crimp marks are prone to remain when a large pressing force from the constant-dimension pressing member 20 is applied on the pair of first outer peripheral surfaces 14A.

In the constant-pressure pressing step, the resin blocking portion 13 between the pair of second outer peripheral surfaces 14B is pressed at a predetermined pressure. The gap between the right-side second outer peripheral surface 14B and the constant-pressure pressing member 40 (contact section 41) and the gap between the left-side second outer peripheral surface 14B and the second fixed member 50 become plugged as a result.

In the injection molding step, a heat-melted resin is injected into the injection space S. Thereafter the injected resin is solidified through cooling. A resin part becomes formed as a result at a predetermined site of the terminal 10. It should be noted that in the present embodiment, the direction of injection of the resin into the injection space S is a direction (downward in the present embodiment) perpendicular to the pressing direction (left-right direction in the present embodiment) of the resin blocking portion 13 by the constant-pressure pressing member 40. Therefore, the pressure at the time of injection of the resin into the injection space S does not readily affect pressing of the resin blocking portion 13 by the constant-pressure pressing member 40. As an example, the resin used in the present embodiment is PPE (polyphenylene ether), but the material of the resin can be changed. Pressing by the constant-dimension pressing member 20 and the constant-pressure pressing member 40 is then released, whereby the production process of the terminal 10 is over.

It should be noted that in the space formation step of the present embodiment, the constant-pressure pressing step is performed after execution of the constant-dimension pressing step. However, the constant-dimension pressing step may be performed after execution of the constant-pressure pressing step.

Figure 4:
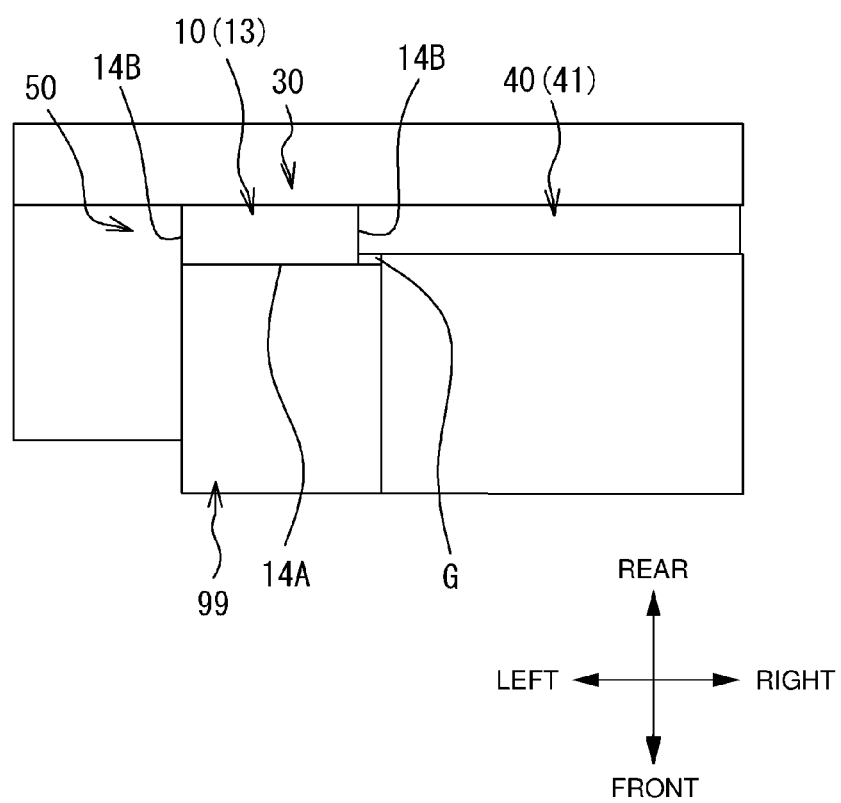
FIG. 4 is a cross-sectional diagram illustrating an example of an instance where the constant-dimension pressing member 20 of FIG. 3 is replaced by a constant-pressure pressing member 99.

An explanation follows next, with reference to FIG. 3 and FIG. 4, on the effect elicited by producing the terminal 10 in accordance with the production method of the present embodiment. FIG. 4 is a cross-sectional diagram illustrating an example of an instance where the constant-dimension pressing member 20 of FIG. 3 is replaced by a constant-pressure pressing member 99. In the production method illustrated in FIG. 4, specifically, not only the section between the second outer peripheral surfaces 14B but also that between the first outer peripheral surfaces 14A are pressed at constant pressure, unlike in the production method of the present embodiment illustrated in FIG. 3. In a case where the resin blocking portion 13 is pressed at constant pressure, excessive deformation in the vicinity of the resin blocking portion 13 is however not prone to occur, but variability in the dimensions of the resin blocking portion 13 is not absorbed. As a result, a gap G may in some instances arise between the constant-pressure pressing member 99 and the constant-pressure pressing member 40 (contact section 41), as illustrated in FIG. 4. In the example illustrated in FIG. 4, dimensional variability of the resin blocking portion 13 in the front-rear direction is not absorbed, and a gap G arises as a result. On the other hand, for instance excessive deformation or damage may occur in the resin blocking portion 13 in a case where the resin blocking portion 13 is pressed, at a fixed dimension, both between the pair of first outer peripheral surfaces 14A and also between the pair of second outer peripheral surfaces 14B.

In the production method of the present embodiment, by contrast, only the section between the pair of first outer peripheral surfaces 14A is pressed at a fixed dimension, from among the four outer peripheral surfaces of the resin blocking portion 13, as illustrated in FIG. 3. As a result, the thickness between the first outer peripheral surfaces 14A deforms moderately and becomes substantially identical to the thickness T of the tip of the contact section 41 of the constant-pressure pressing member 40. The gap at the outer periphery of the resin blocking portion 13 becomes then plugged through pressing of the section between the pair of second outer peripheral surfaces 14B, at constant pressure, by the constant-pressure pressing member 40. Therefore, for instance resin leakage through the gap, and excessive deformation of the resin blocking portion 13, are less likely to occur.

The distance between the pair of first outer peripheral surfaces 14A in the resin blocking portion 13 of the terminal 10 is smaller than the distance between the pair of second outer peripheral surfaces 14B. In this case, dimensional variability between the first outer peripheral surfaces 14A tends to be structurally smaller than dimensional variability between the second outer peripheral surfaces 14B. Accordingly, injection molding is carried out properly, in a state where for instance excessive deformation of the terminal is suppressed, through pressing at a fixed dimension between the first outer peripheral surfaces 14A of smaller dimensional variability.

In particular, at least a portion of the terminal 10 of the present embodiment including the resin blocking portion 13 becomes formed as a result of a step of cutting, in the thickness direction, a plate material of uniform thickness. The pair of first outer peripheral surfaces 14A of the resin blocking portion 13 of the terminal 10 is part of a pair of plate surfaces of a plate material prior to being cut. In other words, the distance DA between the pair of first outer peripheral surfaces 14A matches the thickness of the plate material prior to being cut. It is herein easier to reduce variability in the thickness of the plate material than to reduce variability in the cut dimensions of the plate material. Therefore, variability in the distance DA between the pair of first outer peripheral surfaces 14A is thus suppressed properly.

The reference symbol T denotes the thickness, in a direction perpendicular to the first outer peripheral surfaces 14A, of a contact portion (i.e. tip portion) with the second outer peripheral surfaces 14B of the terminal 10, in the contact section 41 of the constant-pressure pressing member 40. Further, the reference symbol DA denotes the distance between the pair of first outer peripheral surfaces 14A of the terminal 10. In this case, the dimensions of the members and of the fixed dimension are prescribed so that there holds $0 \leq (DA-T) \leq 50$ μm. Therefore, even if a gap arises between the constant-dimension pressing member 20 and the constant-pressure pressing member 40 (contact section 41), the dimension of that gap is 50 μm or less. If the dimension of the gap is 50 μm or less, a resin molten by heating (for instance PPE used in the present embodiment) does not readily flow out through the gap. Therefore, the resin material is properly formed on the terminal.

Concrete embodiments of the present disclosure have been explained in detail above, but these examples are merely illustrative in nature, and are not meant to limit the scope of the claims in any way. The art set forth in the claims encompasses various alterations and modifications of the embodiments illustrated above. For instance, it goes without saying that the mechanism for executing the constant-dimension pressing step and the mechanism for executing the constant-pressure pressing step may be modified as appropriate.

What is claimed is:
1. A method for producing a secondary battery, the method comprising:
a space formation step of forming a resin injection space around a predetermined site of a terminal by plugging an outer periphery of a resin blocking portion, which has a quadrangular prism shape, of the terminal; and an injection molding step of injection-molding a resin part on the terminal by injecting a resin into the injection space, wherein the space formation step includes a constant-dimension pressing step of pressing between a pair of first outer peripheral surfaces extending parallelly to each other, from among four outer peripheral surfaces of the resin blocking portion, thereby bringing a distance between the pair of first outer peripheral surfaces to a predetermined distance; and a constant-pressure pressing step of pressing, at a predetermined pressure, between a pair of second outer peripheral surfaces extending in a direction that intersects the pair of first outer peripheral surfaces, from among the four outer peripheral surfaces of the resin blocking portion.

2. The method according to claim 1, wherein, in the resin blocking portion of the terminal, the distance between the pair of first outer peripheral surfaces is smaller than a distance between the pair of second outer peripheral surfaces.

3. The method according to claim 1, wherein in the constant-pressure pressing step, a constant-pressure pressing member is pressed against at least one of the pair of second outer peripheral surfaces, and $0 \leq (DA-T) \leq 50$ μm is satisfied, T is defined as a thickness, in a direction perpendicular to the pair of first outer peripheral surfaces, of a portion of contact of the constant-pressure pressing member with the at least one of the pair of second outer peripheral surfaces, and DA is defined as a distance between the pair of first outer peripheral surfaces in a state where the constant-dimension pressing step has been performed.

4. The method according to claim 2, wherein in the constant-pressure pressing step, a constant-pressure pressing member is pressed against at least one of the pair of second outer peripheral surfaces, and $0 \leq (DA-T) \leq 50$ μm is satisfied, T is defined as a thickness, in a direction perpendicular to the pair of first outer peripheral surfaces, of a portion of contact of the constant-pressure pressing member with the at least one of the pair of second outer peripheral surfaces, and DA is defined as a distance between the pair of first outer peripheral surfaces in a state where the constant-dimension pressing step has been performed.

* * * * *